(12) United States Patent
Portolese et al.

(10) Patent No.: US 10,968,832 B2
(45) Date of Patent: Apr. 6, 2021

(54) COMBINED OVERSPEED AND FUEL STREAM SELECTOR SYSTEMS

(71) Applicant: HONEYWELL INTERNATIONAL INC., Morris Plains, NJ (US)

(72) Inventors: Larry Portolese, Granger, IN (US); Paul W. Futa, North Liberty, IN (US); Edward Zielinski, South Bend, IN (US); David Tuttle, South Bend, IN (US); Eric Arnett, Grabger, IN (US)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 805 days.

(21) Appl. No.: 15/354,340

(22) Filed: Nov. 17, 2016

(65) Prior Publication Data
US 2018/0135529 A1 May 17, 2018

(51) Int. Cl.
*F02C 7/232* (2006.01)
*F02C 3/20* (2006.01)
*F02C 9/26* (2006.01)

(52) U.S. Cl.
CPC .............. *F02C 7/232* (2013.01); *F02C 3/20* (2013.01); *F02C 9/263* (2013.01); *F05D 2270/02* (2013.01); *F05D 2270/304* (2013.01)

(58) Field of Classification Search
CPC .. F02C 9/263; F02C 9/26; F02C 7/232; F02C 7/22
See application file for complete search history.

(56) References Cited

U.S. PATENT DOCUMENTS

| | | | | |
|---|---|---|---|---|
| 2,989,842 | A * | 6/1961 | Neal | F02K 3/10 60/39.281 |
| 3,433,016 | A * | 3/1969 | Borel | F02C 7/22 60/39.281 |
| 4,145,876 | A | 3/1979 | Stearns | |
| 4,291,532 | A | 9/1981 | Robinson | |
| 5,086,617 | A | 2/1992 | Smith | |
| 6,619,027 | B1 | 9/2003 | Busch | |
| 6,675,570 | B2 * | 1/2004 | Herbison | F02C 9/30 60/39.281 |
| 7,137,242 | B2 | 11/2006 | Griffiths | |
| 7,185,485 | B2 | 3/2007 | Lewis | |
| 7,234,293 | B2 | 6/2007 | Yates et al. | |
| 7,386,981 | B2 | 6/2008 | Zielinski et al. | |
| 7,587,900 | B2 | 9/2009 | Shelby et al. | |
| 7,966,994 | B2 | 6/2011 | Kleckler | |

(Continued)

*Primary Examiner* — Thomas P Burke
(74) *Attorney, Agent, or Firm* — Lorenz & Kopf, LLP (57) ABSTRACT

Embodiments of a combined overspeed and fuel stream selector system are provided. In an embodiment, the assembly includes a conduit network, a Discharge Select Valve (DSV), and a shutoff valve. The DSV is fluidly coupled to a primary fuel inlet, a secondary fuel inlet, and a primary fuel outlet included in the conduit network. The shutoff valve is fluidly coupled between the primary fuel inlet and the primary fuel outlet. In a standard operation mode, the shutoff valve is maintained in an open position, while fuel received at the primary fuel inlet is directed through the shutoff valve, through the DSV, and to the primary fuel inlet. Conversely, in a backup operation mode, the shutoff valve is closed to block fuel flow from the primary fuel inlet to the primary fuel outlet, while the DSV directs fuel flow received at the secondary fuel inlet to the primary fuel outlet.

17 Claims, 3 Drawing Sheets

(56) References Cited

U.S. PATENT DOCUMENTS

| | | | |
|---|---|---|---|
| 8,991,186 B2 | 3/2015 | Bickley et al. | |
| 2007/0234732 A1* | 10/2007 | Shelby | F02C 7/232 60/772 |
| 2008/0296403 A1* | 12/2008 | Futa, Jr. | F02C 7/232 239/95 |
| 2010/0010721 A1 | 1/2010 | Van Vactor et al. | |
| 2010/0132368 A1* | 6/2010 | Lawrence | F02C 7/236 60/790 |
| 2012/0067022 A1* | 3/2012 | Futa | F02C 7/232 60/39.281 |
| 2012/0159953 A1* | 6/2012 | Griffiths | F02C 7/228 60/734 |
| 2014/0205472 A1* | 7/2014 | Hutto, Jr. | F04B 25/00 417/244 |
| 2014/0216037 A1 | 8/2014 | MacDonald et al. | |

* cited by examiner

COMBINED OVERSPEED AND FUEL STREAM SELECTOR SYSTEMS

TECHNICAL FIELD

The following disclosure relates generally to gas turbine engines and, more particularly, to combined overspeed and fuel stream selector systems, which perform multiple synchronized functions when transitioning from a standard operation mode into a backup operation mode.

BACKGROUND

By common design, a Gas Turbine Engine (GTE) includes a combustion section, which is positioned upstream of a turbine section and which contains a main combustor. In certain instances, the GTE may also include an afterburner system that, when activated, generates additional thrust by injecting burn fuel into the core gas flow path downstream of the turbine section. During normal operation, the main combustor and the afterburner system receive separate burn fuel streams from primary and secondary burn fuel supply paths, respectively. However, in the event of a failure within the primary burn fuel supply path, burn fuel flow may be rerouted from the secondary burn fuel supply path to the main combustor to avert a potential inflight shutdown of the GTE. In conjunction with this rerouting functionality, flow of the primary burn fuel stream may be quickly shutoff to prevent the core rotational speeds of the GTE from surpassing critical speed thresholds (hereafter, an "engine overspeed condition"). Additional actions may also be taken to prevent deadheading and to limit any pressure spikes across the main fuel pump located in the primary burn fuel supply path.

In conventional metered fuel control assemblies, the above-described functions are performed by multiple independent systems. These systems may include separate fuel stream selector and overspeed systems, which are jointly controlled by an engine controller. When detecting a fault within the primary burn fuel supply path, the engine controller may command the fuel stream selector system to perform the above-described rerouting function (that is, reroute the secondary metered burn fuel stream to the main combustor), while further commanding the overspeed system to provide the above-described overspeed-protection function (that is, rapidly shutoff flow of the primary burn fuel stream to prevent an engine overspeed condition). As independent systems, the fuel stream selector system and the overspeed system are controlled through separate electronic interfaces and various associated components (e.g., servo valves and/or solenoids), which can add considerable complexity, part count, cost, and weight to the metered fuel control assembly. Additional complexity is also introduced from a control scheme or logic standpoint as the engine controller may be required to precisely coordinate an orderly transfer in fuel metering authority from a metering valve located in the primary burn fuel supply path to a separate metering valve located in the secondary burn fuel supply path.

BRIEF SUMMARY

Embodiments of a combined overspeed and fuel stream selector system are provided, which performs multiple synchronized actions when transitioning from a standard operation mode into a backup operation mode. In an embodiment, the combined overspeed and fuel stream selector system includes a conduit network, a Discharge Select Valve (DSV), and a shutoff valve. The DSV is fluidly coupled to a primary fuel inlet, a secondary fuel inlet, and a primary fuel outlet included in the conduit network. The shutoff valve is fluidly coupled between the primary fuel inlet and the primary fuel outlet. In the standard operation mode, the shutoff valve is maintained in an open position, while fuel received at the primary fuel inlet is directed through the shutoff valve, through the DSV, and to the primary fuel inlet. Conversely, in the backup operation mode, the shutoff valve is closed to block fuel flow from the primary fuel inlet to the primary fuel outlet, while the DSV directs fuel flow received at the secondary fuel inlet to the primary fuel outlet. In certain embodiments, the selector system may also contain a fuel return outlet and bypass valve, which is maintained in a pressure regulation position in the standard operation mode. When the selector system switches into the backup mode operation, the bypass valve moves into an open position and allows substantially unimpeded fuel flow from the primary fuel inlet to the fuel return outlet.

In another embodiment, the combined overspeed and fuel stream selector system includes a conduit network including a primary fuel inlet, a secondary fuel inlet, a primary fuel outlet, and a fuel return outlet. A DSV is positioned in the conduit network and is movable between: (i) a standard routing position in which the DSV directs fuel flow received at the primary fuel inlet to the primary fuel outlet, and (ii) a backup routing position in which the DSV directs fuel flow received at the secondary fuel inlet to the primary fuel outlet. A bypass valve is further positioned in the conduit network and is movable between: (i) a pressure regulating position in which the bypass valve impedes fuel flow from the primary fuel inlet to the fuel return outlet, and (ii) a non-pressure regulating position in which the bypass valve permits substantially unimpeded fuel flow from the primary fuel inlet to the fuel return outlet. A servo valve is fluidly coupled to the DSV and to the bypass valve. The servo valve is controllable to selectively change the fuel pressures routed to the DSV and the bypass to modulate the DSV between the standard and backup routing positions, while concurrently moving the bypass valve between the pressure regulating and non-pressure regulating positions.

Embodiments of a metered fuel control assembly are further provided. In an embodiment, the metered fuel control assembly includes a combined overspeed and fuel stream selector system, as well as a gas turbine engine containing primary and secondary burn fuel injection zones. The combined overspeed and fuel stream selector system includes, in turn, primary and secondary fuel inlets, as well as primary and secondary fuel outlets fluid coupled to the primary and secondary burn fuel injection zones, respectively. The combined overspeed and fuel stream selector system is operable in standard and backup operation modes. In the standard operation mode, fuel received at the primary fuel inlet is directed to the primary burn fuel injection zone through the primary fuel outlet, while fuel received at the secondary fuel inlet is directed to the secondary burn fuel injection zone through the secondary fuel outlet. In the backup operation mode, fuel flow from the primary fuel inlet to the primary fuel outlet is blocked, while burn fuel received at the secondary fuel inlet is rerouted to flow through primary fuel outlet and to the primary burn fuel injection zone. In certain implementations, the combined overspeed and fuel stream selector system may further include an engine controller and a servo valve, which is operably coupled to the engine controller and which is controllable to switch operation of the selector system between the standard operation mode and the backup operation mode.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. The term "exemplary," as appearing throughout this document, is synonymous with the term "example" and is utilized repeatedly below to emphasize that the description appearing in the following section merely provides multiple non-limiting examples of the invention and should not be construed to restrict the scope of the invention, as set-out in the Claims, in any respect.

The following describes embodiments of a combined overspeed and fuel stream selector system or, more briefly, an "overspeed/stream selector system," which performs multiple synchronized functions when transitioning from a standard operation mode into a backup operation mode. For example, the overspeed/stream selector system may route a primary burn fuel stream to a primary fuel injection zone when operating in the standard operation mode, while further routing a secondary burn fuel stream to a secondary fuel injection zone. Comparatively, in the backup operation mode, the overspeed/stream selector system may route the secondary burn fuel stream to the primary fuel injection zone, while blocking or shutting-off fuel flow of the primary burn fuel stream through the system. The overspeed/stream selector system may switch or be switched into the backup operation mode when, for example, a failure occurs affecting the regular supply or metering of the primary burn fuel stream. The overspeed/stream selector system is particularly well-suited for usage in conjunction with an afterburner-equipped Gas Turbine Engine (GTE), such as a jet engine deployed onboard a military aircraft. In this case, the primary fuel injection zone may be located in the main combustor of the GTE, while the secondary fuel injection zone is included within an afterburner system. By switching into the backup operation mode when a failure occurs within the primary burn fuel stream, the overspeed/stream selector system ensures that a substantially uninterrupted stream of burn fuel is continually supplied to the main combustor to prevent a potential inflight shutdown of the GTE, which provides a critical redundancy in the case of a single engine aircraft. Additionally, the overspeed/stream selector further prevents the occurrence of an engine overspeed condition by rapidly shutting-off flow of the primary metered fuel stream through the selector system when switched into the backup mode.

The foregoing benefits notwithstanding, the overspeed/stream selector system need not be utilized in conjunction with an afterburner-equipped GTE in all instances. Rather, embodiments of the overspeed/stream selector system can be utilized in conjunction with any type of GTE having at least two burn fuel injection zones, which are supplied with separate metered fuel streams during standard or normal GTE operation. The burn fuel injection zones can have any positioning within a given GTE, which again may or may not be equipped with an afterburner system. For example, in other implementations, the overspeed/stream selector system may selectively route metered burn fuel streams to different sets of nozzles contained within the main combustor of a GTE. Thus, while primarily described below in connection with afterburner-equipped GTE, this description is provided to only establish a non-limiting context in which exemplary embodiments of the overspeed/stream selector system may be better understood.

In certain instances, the overspeed/stream selector system may perform additional functions beyond the above-described fuel stream rerouting and overspeed-protection functionalities. For example, embodiments of the overspeed/stream selector system may provide metering of one or more burn fuel streams when received by the selector system in a non-metered form. More specifically, in one implementation, the overspeed/stream selector system provides metering of the primary burn fuel stream utilizing a first metering valve contained within the selector system, while metering of the secondary burn fuel stream is performed upstream of the selector system utilizing a second metering valve positioned in the secondary fully supply path. Additionally or alternatively, embodiments of the overspeed/stream selector system may be equipped with one or more mechanisms for providing pressure relief downstream of the fuel pump or pumps included in the primary burn fuel flow path when the selector system is switched in the backup operation mode. In an embodiment, the pressure relief mechanism assumes the form of a bypass valve, which is fully opened to reduce pressure accumulation across the fuel pump and to prevent pump deadheading when the selector system is switched into the backup operation mode.

Due to its unique multifunctional capabilities, the overspeed/stream selector system can replace multiple, separate systems within a metered fuel control assembly, such as separate fuel stream selector and overspeed systems. In so doing, the overspeed/stream selector system can provide significant reductions in the overall complexity, part count, cost, weight, and envelope of the metered fuel control assembly. Additionally, in certain embodiments, the overspeed/stream selector system may be rapidly toggled between operational modes through the actuation of a single device or control valve. The control valve may be, for example, an electro-hydraulic servo valve having an electronic interface, which can be readily connected to existing engine controllers. In such embodiments, the engine controller need only provide a single control signal to switch the overspeed/stream selector system into the backup operation mode and thereby cause the selector system to perform the multiple complementary functionalities described-above in a rapid and synchronized manner. This may help simply the control logic of the engine controller and allow incorporation of the overspeed/stream selector system into GTE platforms with relatively little modification. An exemplary embodiment of an overspeed/stream selector system will now be described in conjunction with FIGS. 1-3.

Figure 1:
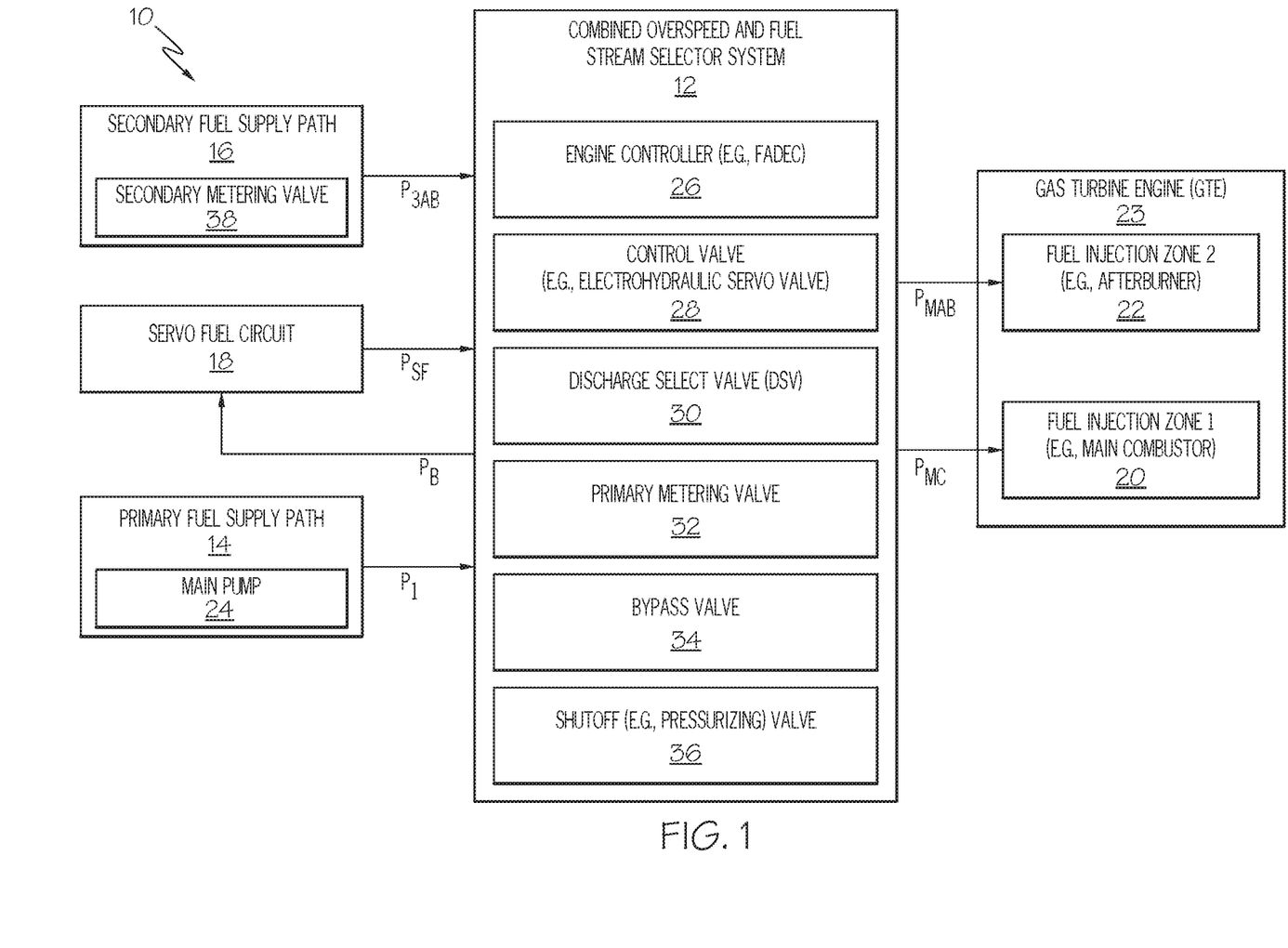
FIG. 1 is a block diagram of a metered fuel control assembly including a combined overspeed and fuel stream selector system, as illustrated in accordance with an exemplary embodiment of the present disclosure.

FIG. 1 is a block diagram of a metered fuel control assembly 10 including an overspeed/stream selector system 12, as illustrated in accordance with an exemplary and non-limiting embodiment of the present disclosure. In addition to overspeed/stream selector system 12, metered fuel control assembly 10 includes a primary burn fuel supply path 14, a secondary burn fuel supply path 16, a servo fuel circuit 18, a primary burn fuel injection zone 20, and a secondary burn fuel injection zone 22. Burn fuel injection zones 20, 22 are located within a Gas Turbine Engine (GTE) 23. In one embodiment, burn fuel injection zones 20, 22 are located within a main combustor contained within GTE 23. In another embodiment, and as indicated in FIG. 1, burn fuel injection zone 20 is located within a main combustor of GTE 23, while burn fuel injection zone 22 is located within an afterburner system downstream of the main combustor. In such embodiments, GTE 23 may assume the form of a jet engine deployed onboard a single engine military aircraft. This example notwithstanding, burn fuel injection zones 20, 22 can have various other configurations without limitation; and, in further embodiments, metered fuel control assembly 10 may include more than two burn fuel injection zones.

Overspeed/stream selector system 12 can include any number and type of components suitable for performing the functions described herein. In the illustrated embodiment, and by way of non-limiting example only, overspeed/stream selector system 12 includes the following components: (i) an engine controller 26, such as a Full Authority Digital Engine Controller (FADEC); (ii) a control valve, such as a servo valve 28; (iii) a Discharge Select Valve (DSV) 30; (iv) a primary metering valve 32; (v) a bypass valve 34; and (vi) a fuel shutoff valve 36. Examples of the aforementioned components, the functionality of each component, and manners in which these components may be interconnected are described below in conjunction with FIGS. 2 and 3. The following description notwithstanding, it is emphasized that overspeed/stream selector system 12 may include a different number and type of components in further embodiments.

As schematically represented by arrows appearing on the left side of FIG. 1, overspeed/stream selector system 12 includes first, second, and third fuel inlets. During operation of overspeed/stream selector system 12, the first fuel inlet receives burn fuel from primary burn fuel supply path 14 at a primary metering valve supply pressure (hereafter, pressure $P_1$). Primary burn fuel supply path 14 may provide this fuel to selector system 12 as an unmetered fuel stream, which is then directed through primary metering valve 32 for metering. Alternatively, primary burn fuel supply path 14 may supply burn fuel as a pre-metered fuel stream, in which case selector system 12 may not contain primary metering valve 32. The second fuel inlet of overspeed/stream selector system 12 receives a second burn fuel stream from primary burn fuel supply path 14 at a metered afterburner supply pressure (hereafter, pressure $P_{3AB}$). As indicated in FIG. 1 by the inclusion of metering valve 38 in burn fuel supply path 16, the burn fuel provided by secondary burn fuel supply path 16 may be received as a pre-metered fuel stream. Finally, the third fuel inlet of overspeed/stream selector system 12 receives a servo fuel supply from servo fuel circuit 18 at a servo fuel supply pressure (hereafter, pressure $P_{SF}$).

With continued reference to FIG. 1, overspeed/stream selector system 12 further includes first, second, and third fuel outlets. The first and second fuel outlets of overspeed/stream selector system 12 are fluidly coupled to burn fuel injection zones 20, 22, respectively. During normal operation of metered fuel control assembly 10, overspeed/stream selector system 12 supplies a first metered burn fuel stream to primary burn fuel injection zone 20 at a main combustor metered flow pressure (hereafter, pressure $P_{MC}$). At the same time, overspeed/stream selector system 12 delivers a second metered burn fuel stream to secondary burn fuel injection zone 22 at an afterburner metered flow pressure (hereafter, pressure $P_{MAB}$). When functioning in below-described backup operation mode, however, overspeed/stream selector system 12 shuts-off fuel flow to secondary burn fuel injection zone 22, while continuing to supply metered burn fuel to primary burn fuel injection zone 20 at pressure $P_{MC}$. Finally, the third fuel outlet of overspeed/stream selector system 12 (referred to below as the "fuel return outlet") is fluidly coupled to servo fuel circuit 18 and, during system operation, provides a return fuel stream to servo fuel circuit 18 at a servo return pressure (hereafter, pressure $P_B$).

Overspeed/stream selector system 12 is operable in at least a standard operation mode and a backup operation mode. In the standard operation mode, overspeed/stream selector system 12 routes fuel flow received from burn fuel supply paths 14, 16 to burn fuel injection zones 20, 22, respectively. Comparatively, in the backup operation mode, overspeed/stream selector system 12 reroutes fuel flow from secondary burn fuel supply path 16 to primary burn fuel injection zone 20, while interrupting the flow of metered burn fuel to secondary burn fuel injection zone 22. Overspeed/stream selector system 12 may switch or be switched to the backup operation mode if and when, for example, a failure should occur within primary burn fuel supply path 14. In this manner, overspeed/stream selector system 12 provides a redundancy or failsafe functionality, as might be particularly useful in the context of a single engine aircraft (e.g., a military jet having a main combustor and an afterburner in which burn fuel injection zones 20, 22 are respectively located) to decrease the likelihood of a single failure resulting in-flight shutdown or an overspeed condition of the engine. Additionally and concurrently, overspeed/stream selector system 12 provides a pressure limiting function to protect main fuel pump 24 upstream of selector system 12. One manner in which overspeed/stream selector system 12 can be structurally implemented to perform such multiple, complementary functions will now be described in conjunction with FIGS. 2 and 3.

Figure 2:
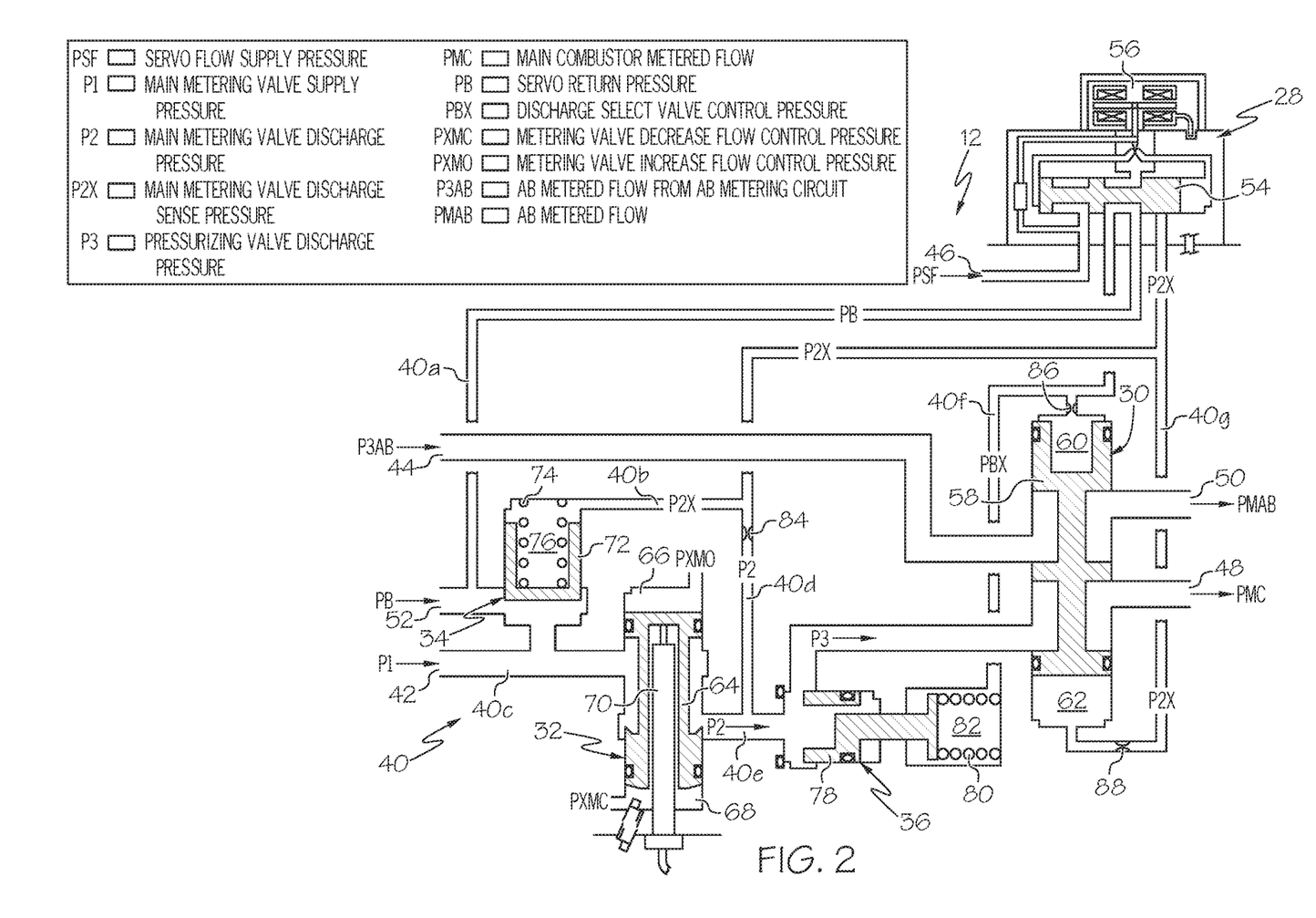
FIGS. 2 and 3 are schematics of the exemplary combined overspeed and fuel stream selector system shown in FIG. 1, as illustrated in standard and backup operation modes, respectively.
Figure 3:
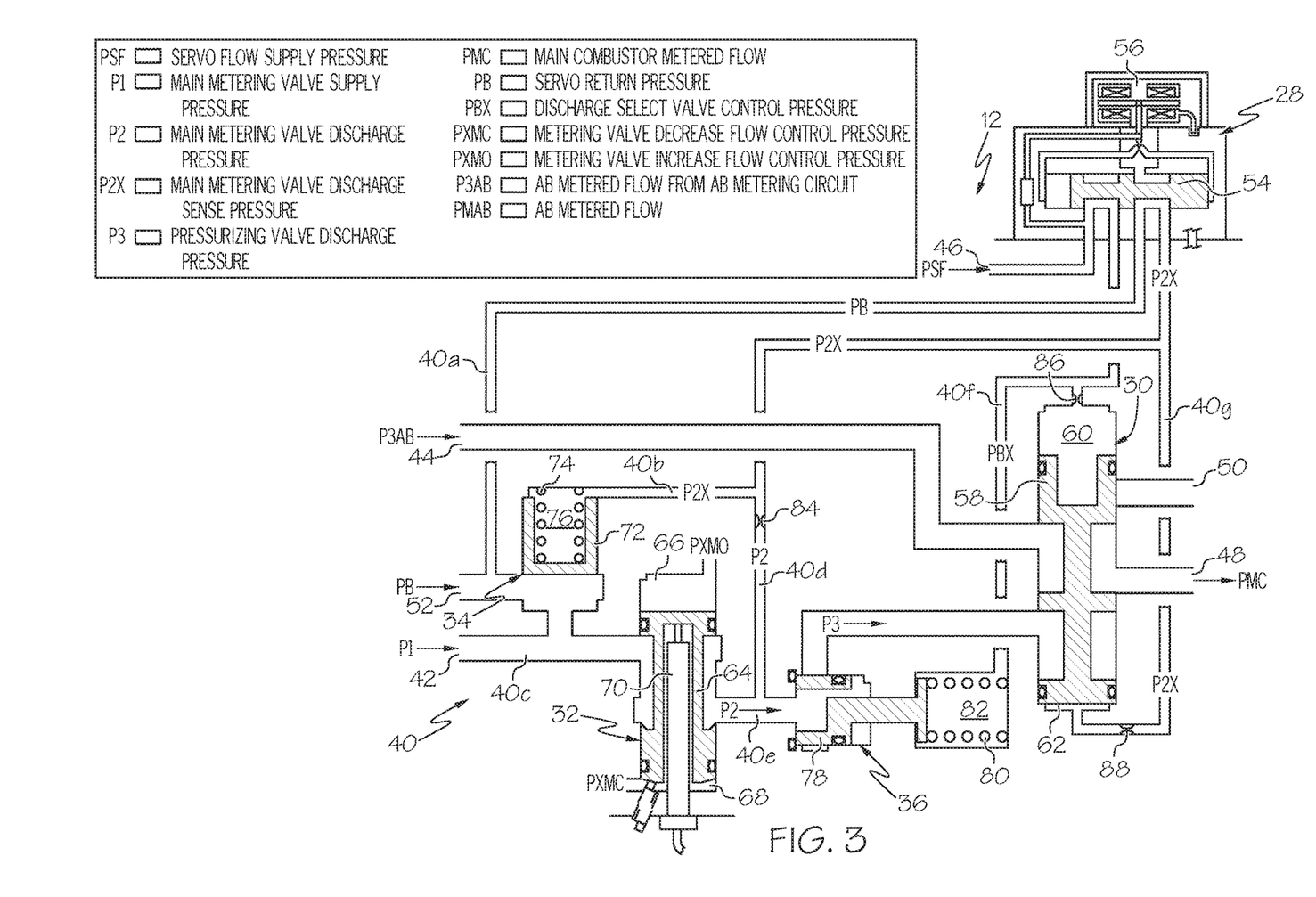

FIGS. 2 and 3 are schematics of exemplary overspeed/stream selector system 12, as illustrated in standard and backup operation modes, respectively. Exemplary structural implementations of servo valve 28, DSV 30, primary metering valve 32, bypass valve 34, and shutoff valve 36 are shown in FIGS. 2 and 3. For consistently, the foregoing components are identified utilizing the same reference numerals as introduced above in connection with FIG. 1. It will be understood, however, that servo valve 28, DSV 30, primary metering valve 32, bypass valve 34, shutoff valve 36, and the various other components of selector system 12 can differ structurally to varying extents in further embodiments as compared to the exemplary implementations shown in FIGS. 2 and 3. For example, shutoff valve 36 assumes the form of a modified pressurizing valve in the illustrated embodiment and is hereafter referred to as "pressurizing valve 36." In further embodiments, however, shutoff valve 36 can assume another form (e.g., that of a solenoid-actuated valve) capable of rapidly blocking flow of the primary metered burn fuel stream when selector system 12 is switched into the backup operation mode.

The components of overspeed/stream selector system 12 are fluidly coupled or interconnected by a number of flow passages or conduits 40(a)-(g), which collectively form a conduit network 40. Conduit network 40 and, more generally, overspeed/stream selector system 12 includes three fuel inlets in the illustrated example: a primary fuel inlet 42, a secondary fuel inlet 44, and a servo fuel inlet 46. When selector system 12 is integrated into metered fuel control assembly 10 (FIG. 1), fuel inlets 42, 44, 46 may be fluidly coupled to primary burn fuel supply path 14, to secondary burn fuel supply path 16, and to servo fuel circuit 18, respectively, as discussed above in conjunction with FIG. 1. Selector system 12 further includes a primary fuel outlet 48, a secondary fuel outlet 50, and a servo return fuel outlet 52. Fuel outlets 48, 50, 52 correspond to the first, second, and third fuel outlets discussed above in conjunction with FIG. 1. Thus, in the context of metered fuel control assembly 10 (FIG. 1), fuel outlets 48, 50, 52 may be fluidly coupled to servo fuel circuit 18, primary burn fuel injection zone 20, and secondary burn fuel injection zone 22, respectively.

In the illustrated example, servo valve 28 is a two stage, four-way Electro-Hydraulic Servo Valve (EHSV) containing a valve element in the form of a servo valve spool 54. Servo valve spool 54 is slidably disposed within an elongated cavity or bore provided in the housing assembly of selector system 12. Servo valve spool 54 is bi-stable and, thus, movable between first and second fuel routing positions. Servo valve spool 54 may be selectively secured in either fuel routing position by a solenoid or torque motor 56, which can be triggered by an operatively-connected controller (e.g., engine controller 26) to transition the servo valve spool 54 between the first and second fuel routing positions. The position of servo valve spool 54 dictates the operative mode in which overspeed/stream selector system 12 functions. Thus, servo valve 28 and torque motor 56 collectively serve as a control mechanism, which can be controlled to rapidly switch overspeed/stream selector system 12 between the standard operation mode (FIG. 2) and the backup operation mode (FIG. 3). Furthermore, torque motor 56 can be controlled through a single electronic interface to simplify control schemes and ensure precise coordination of the various functions performed by overspeed/stream selector system 12 when switching between its operative modalities. In further embodiments, the position of servo valve spool 54 may be controlled utilizing a different type of control mechanism, which automatically triggers movement of servo valve spool 54 in response to detection of one or more monitored conditions indicative of a failure occurring in the primary burn fuel supply path 14, such as a failure affecting proper operation of metering valve 32.

DSV 30 contains a DSV valve element in the form of a DSV spool 58. DSV spool 58 is slidably positioned between opposing DSV control chambers 60, 62. DSV spool 58 is movable between a standard routing position and a backup routing position, as shown in FIGS. 2 and 3, respectively. In the standard routing position (FIG. 2), DSV spool 58 is positioned to direct fuel flow received at primary fuel inlet 42 to primary fuel outlet 48, while further directing fuel flow received at secondary fuel inlet 44 to secondary fuel outlet 50. Conversely, in the backup routing position (FIG. 3), DSV spool 58 and, more generally, DSV 30 directs fuel flow received at secondary fuel inlet 44 to primary fuel outlet 48. At the same time, DSV 30 (along with pressurizing valve 36) blocks fuel flow from primary fuel inlet 42 to primary fuel outlet 48. If desired, damping bleeds 86, 88 may be formed in the flow passages or conduits 40(f), 40(g), which fluidly connect to DSV control chambers 60, 62, respectively. Damping bleeds 86, 88 promote smooth, non-abrupt movement of DSV spool 58 between the standard and backup routing positions as the fuel pressures across DSV spool 58 vary in conjunction with movement of servo valve spool 54. If desired, DSV spool 58 may carry dynamic seals to minimize leakage from control chambers 60, 62, and may be sized to limit pressure loss at maximum metered flow.

When included in overspeed/stream selector system 12, primary metering valve 32 can assume any form suitable for metering the primary burn fuel stream when selector system 12 operates in the standard operation mode. In the illustrated example, specifically, primary metering valve 32 includes a piston-style metering valve piston 64, which is slidably disposed between two metering valve control chambers 66, 68. As labeled in FIG. 2, metering valve control chamber 66 is fluidly coupled to a fuel source supplied at a metering valve increase flow control pressure ($P_{XMO}$), while opposing metering valve control chamber 68 is fluidly coupled to a fuel source supplied at a metering valve decrease flow control pressure ($P_{XMC}$). The pressure differential ($\Delta P$) between $P_{XMO}$ and $P_{XMC}$, as well as the effective surface area of metering valve piston 64 exposed to these pressures, determines the translational position of valve element 64. The translational position of metering valve piston 64 along with the pressure of the fuel supplied to the inlet of primary metering valve 32 (the "main metering valve supply pressure" or, more simply, "$P_1$"), in turn, determines the flow rate across metering valve 32 and the fuel pressure at the outlet of metering valve 32 (the "main metering valve discharge pressure" or, more simply, "$P_2$"). Finally, positional feedback may be provided by monitoring the translational position of metering valve piston 64 utilizing Linear Variable Differential Transformer (LVDT) 70 or other sensor.

With continued reference to FIGS. 2 and 3, bypass valve 34 includes piston-style bypass valve element 72 and a spring 74. Bypass valve element 72 is slidably disposed within a cavity or bore and movable between an extended, pressure regulating position (shown in FIG. 2) and a retracted, non-pressure regulating position (shown in FIG. 3). Bypass valve element 72 defines, in part, a bypass valve control chamber 76 housing spring 74. Collectively, spring 74 and the fuel pressure within control chamber 76 (the "main metering valve discharge sense pressure" or, more simply, "$P_{2X}$") urge movement of bypass valve element 72 toward the pressure regulating position (FIG. 2). Conversely, the pressure applied to the exterior of bypass valve element 72 ($P_1$) urges movement of bypass valve element 72 toward the non-pressure regulating position. Thus, when the differential between $P_1$ and $P_{2X}$ becomes sufficiently pronounced in favor of $P_1$, bypass valve element 72 (and, more generally, bypass valve 34) transitions from the pressure regulating position (FIG. 2) to the non-pressure regulating position (FIG. 3). In the pressure regulating position, bypass valve 34 impedes fuel flow from primary fuel inlet 42 to fuel return outlet 52. In the non-pressure regulating position, bypass valve 34 permits substantially unimpeded fuel flow from primary fuel inlet 42 to fuel return outlet 52. In further embodiments, a different type of valve can be utilized for bypass valve 34, including both proportional and integrating-type valves. A bleed 84 is further formed in conduit 40(d) between the outlet of metering valve 32 and bypass valve control chamber 76 to promote smooth damped movement of bypass valve element 72 in standard operation mode (FIG. 2). Additionally, bleed 84 serves as a substantial restriction to fluidly segregate conduit 40(b) from conduit 40(d) when selector system 12 is switched into the backup operation mode (FIG. 3).

Turning lastly to pressurizing valve 36, valve 36 includes a pressurizing valve element or piston 78, a spring 80, and a pressurizing valve control chamber 82. Pressurizing valve element 78 is movable between a range of open, pressurizing positions (one of which is shown in FIG. 2) and a closed, shutoff position (shown in FIG. 3). Spring 80 biases pressurizing valve 36 toward the closed, shutoff position (FIG. 3). When the pressure differential across pressurizing valve element 78 is insufficient to overcome the resilient bias force exerted on valve element 78 by spring 80, pressurizing valve 36 thus remains in the closed position shown in FIG. 3. When the pressure differential between the fuel pressure at the inlet of valve 36 surpasses the fuel pressure within control chamber 82, as taken in combination with bias force of spring 80, pressurizing valve element 78 moves into an open position and permits pressurized fuel flow from primary fuel inlet 42, through metering valve 32, through pressurizing valve 36, and to DSV 30.

Operation of overspeed/stream selector system 12 in the standard operation mode (FIG. 2) will now be described. In this operational mode, servo valve spool 54 is maintained in a first position (the leftmost position in the illustrated flow schematic) in which servo valve 28 places a relatively low pressure, the servo return fuel pressure (PB), in fluid communication with conduit 40(f). This sets the DSV control pressure (PBX) at a low value and effectively places the servo return fuel pressure (PB) in fluid communication with DSV control chamber 60. At the same time, servo valve 28 further places the opposing DSV control chamber 62 in fluid communication with the metering valve discharge sense pressure (P2X), which is relatively high as compared to PB and PBX. DSV spool 58 is consequently maintained in the standard routing position (FIG. 2) by the pressure differential between the relatively low fuel pressure within DSV control chamber 60 (PB, PBX) and the relatively high fuel pressure within DSV control chamber 62 (P2X). Due to this positioning of DSV spool 58, DSV 30 routes burn fuel received at primary fuel inlet 42 to primary fuel outlet 48 (and, therefore, to primary fuel injection zone 20 shown in FIG. 1), while further routing burn fuel received at secondary fuel inlet 44 to secondary fuel outlet 50 (and, therefore, to secondary burn fuel injection zone 22 shown in FIG. 1).

As noted above, the metering valve discharge sense pressure ($P_{2X}$) is relatively high when overspeed/stream selector system 12 operates in the standard operation mode (FIG. 2), as determined by the fuel pressure at the outlet of metering valve 32 ($P_2$). The metering valve discharge sense pressure ($P_{2X}$) is ported to or placed in fluid communication with bypass valve control chamber 76 through conduit 40(b). This fuel pressure, along with the spring force exerted on bypass valve element 72 by spring 74, maintains bypass valve 34 in the extended, pressure-regulating position (FIG. 2). Accordingly, relatively little burn fuel flow is permitted from primary fuel inlet 42, through conduit 40(c), and to servo fuel return outlet 52 when selector system 12 functions in the standard operation mode (FIG. 2). Fuel flow received at primary fuel inlet 42 is instead predominately directed through metering valve 32, through pressurizing valve 36, through DSV 30, and to primary fuel outlet 48 in the previously-described manner. Additionally, when overspeed/stream selector system 12 operates in the standard operation mode (FIG. 2), the DSV control pressure ($P_{BX}$) is routed to control chamber 82 of pressurizing valve 36. The fuel pressure within control chamber 82 thus equalizes with $P_B$, $P_{BX}$, and pressurizing valve piston 78 is permitted to translate through its range of open positions against the fuel pressure within control chamber 82 and the bias force of spring 80 to provide the desired pressurized functionality.

To switch overspeed/stream selector system 12 into the backup operation mode (FIG. 3), servo valve spool 54 is moved into a second fuel routing position; e.g., by commanding torque motor 56 to move spool 54 to the right in the illustrated flow schematic. With servo valve spool 54 moved to this position, servo valve 28 now routes fuel at the relatively high servo flow supply pressure ($P_{SF}$) to conduit 40(f). The DSV control pressure ($P_{BX}$) and the pressure within DSV control chamber 60 are boosted as a result. Concurrently, the pressure supplied to opposing DSV control chamber 62 decreases to the relatively low servo return fuel pressure ($P_B$) as servo valve 28 now places conduit 40(g) in fluid communication with conduit 40(a). A substantially unobstructed flow path is now provided between the outlet of metering valve 32, DSV control chamber 62, and servo return fuel outlet 52 to decrease the metering valve discharge sense pressure ($P_{2X}$). In response to the changing pressure differential between DSV control chambers 60, 62, DSV spool 58 rapidly moves to the backup fuel routing position (downward in FIG. 3). With DSV spool 58 in the backup fuel routing position, DSV 30 reroutes fuel flow received at secondary fuel inlet 44 to primary fuel outlet 48. In the backup routing position, DSV spool 58 also blocks fuel flow from secondary fuel inlet 44 to secondary fuel outlet 50, and may further help block any leakage across pressurizing valve 36 from primary fuel inlet 42 to primary fuel outlet 48. In this manner, servo valve 28 sets the control pressures acting on opposing sides of DSV spool 58 to alter the translational position of spool 58 as selector system 12 switches between its operative modes.

When in the backup operation mode (FIG. 3), overspeed/stream selector system 12 further blocks fuel flow of the primary burn fuel stream through selector system 12 to, for example, prevent an engine overspeed condition. This is accomplished by leveraging valve 36 to not only provide the desired pressurizing functionality, but to also serve as a shutoff valve. Overspeed/stream selector system 12 is designed to rapidly close pressurizing valve 36 when selector system 12 is switched into the backup operation mode via actuation of servo valve 28. Specifically, in the backup operation mode, the metering valve discharge sense pressure ($P_{2X}$) decrease as servo valve 28 places conduits 40(a), 40(b), 40(g) in fluid communication with servo return fuel outlet 52. Conversely, the DSV control pressure ($P_{BX}$) increases as servo fuel inlet 46 is now fluidly coupled to conduit 40(f) through servo valve 28. The pressure differential across pressurizing valve element 78 and the spring force exerted by spring 80 thus cause pressuring pressurizing valve 36 to rapidly close and shutoff flow of the primary fuel stream. Concurrently, bypass valve 34 fully opens (that is, moves to the non-pressure regulating position shown in FIG. 3) to prevent any undesired spikes in fuel pressure and the deadheading of the pump or pumps upstream of primary fuel inlet 42 (e.g., main fuel pump 24 shown in FIG. 1). Bypass valve 34 opens in this manner due to the increase in the main metering valve supply pressure ($P_1$) resulting from closure of pressurizing valve 36, taken in combination with the decrease in the main metering valve discharge sense pressure ($P_{2X}$). In this manner, overspeed/stream selector system 12 provides multiple complementary functions (e.g., fuel rerouting, overspeed protection, and pump pressure relief functionalities) when switched into the backup operation mode in a highly synchronized and rapid manner.

There has thus been provided embodiments of an overspeed/stream selector system, which performs multiple synchronized functions when transitioning from a standard operation mode into a backup operation mode. Embodiments of the overspeed/stream selector system routes burn fuel from a primary burn fuel supply path to a first combustion injection zone (e.g., located within a main combustor) and from a secondary burn fuel supply path to a second combustion injection zone (e.g., included in an afterburner system) when the selector system operates in the standard operation mode. Conversely, when in the backup operation mode, the selector system reroutes burn fuel flow from the secondary burn fuel supply path to the first combustion injection zone. When transitioning into the backup operation mode, overspeed/stream selector system fuels flow is blocked to the second combustion injection zone to prevent an engine overspeed condition. In certain embodiments, the fuel selector/shutoff may also reduce flow restrictions in a return fuel flow path to limit any pressure increase across one or more pump or pumps located within the primary burn fuel supply path. In this manner, the overspeed/stream selector system provides a synchronized, multifunctional response when transitioning into backup operational mode. The overspeed/stream selector system can thus replace multiple, separate systems of the type conventionally employed within metered fuel control assemblies to reduce part count, complexity, cost, and envelope of the assembly. As a further benefit, embodiments of the overspeed/stream selector system may reduce control scheme complexity by enabling rapid switched between operational modes utilizing a single electronic interface associated with a remotely-controlled mechanism, such as an electro-hydraulic control valve.

In one group of embodiments, the combined overspeed and fuel stream selector system includes a conduit network having a primary fuel inlet, a secondary fuel inlet, a primary fuel outlet, and a secondary fuel outlet. A shutoff valve is fluidly coupled between the primary fuel inlet and the primary fuel outlet, and a DSV fluidly coupled to the shutoff valve. The combined overspeed and fuel stream selector system is operable in a standard operation mode and a backup operation mode. In the standard operation mode, the shutoff valve is maintained in an open position, while fuel received at the primary fuel inlet is directed through the shutoff valve, through the DSV, and to the primary fuel inlet. Comparatively, in the backup operation mode, the shutoff valve is maintained in a closed position to block fuel flow from the primary fuel inlet to the primary fuel outlet, while the DSV reroutes fuel flow received at the secondary fuel inlet to the primary fuel outlet. In certain embodiments, the DSV may also direct fuel received at the secondary fuel inlet to the secondary fuel outlet in the standard operation mode. Additionally or alternatively, the DSV may further blocks fuel flow from the primary fuel inlet to the primary fuel outlet in the backup operation mode.

In other embodiments, the conduit network may further include a fuel return outlet, while the selector system further comprises a bypass valve fluidly coupled between the primary fuel inlet and the fuel return outlet. In such embodiments, the bypass valve impedes fuel flow from the primary fuel inlet to the fuel return outlet in the standard operation mode and permits substantially unimpeded fuel flow from the primary fuel inlet to the fuel return outlet in the backup operation mode. In such embodiments, the selector system may further include a control valve fluidly coupled to the shutoff valve, to the DSV, and to the bypass valve through the conduit network. The control valve may be configured to switch operation of the combined overspeed and fuel stream selector system between the standard and backup operation modes. An engine controller may further be included in the selector system, in which case the control valve may assume the form of an electro-hydraulic servo valve having an electronic interface operably coupled to the engine controller.

In still further embodiments, the above-described combined overspeed and fuel stream selector system may further include a fuel metering valve fluidly coupled between the primary fuel inlet and the DSV. Additionally, the shutoff valve may assume the form of a pressurizing valve located downstream of the fuel metering valve. In certain cases, the shutoff valve may contain a shutoff valve control chamber, the DSV may contain a first DSV control chamber, and the fuel metering valve may include an outlet fluidly coupled to the shutoff valve control chamber and to the first DSV control chamber. In an implementation, the selector system may also include a bypass valve upstream of the fuel metering valve, and the bypass valve may contain a bypass valve control chamber fluidly coupled to the outlet of the fuel metering valve.

In yet further embodiments of the combined overspeed and fuel stream selector system, the DSV may include a DSV spool, a first DSV control chamber on a first side of the DSV spool, and a second DSV control chamber on a second, opposing side of the DSV spool. Additionally, the selector system may include a servo valve fluidly coupled to the first and second DSV control chambers. The servo valve may be controllable to position the DSV spool when the combined overspeed and fuel stream selector system transitions from the standard operation mode into the backup operation mode by increasing a fuel pressure within the first DSV control chamber, while simultaneously decreasing a fuel pressure within the second DSV control chamber. In another implementation wherein the conduit network further includes a fuel return outlet, the servo valve may be movable between: (i) a first position (e.g., the position shown in FIG. 2) in which the servo valve fluidly couples the first DSV control chamber to the fuel return outlet, while fluidly isolating the second DSV control chamber from the fuel return outlet, and (ii) a second position (E.g., the position shown in FIG. 3) in which the servo valve fluidly couples the second DSV control chamber to the fuel return outlet, while fluidly isolating the first DSV control chamber therefrom. Similarly, in an implementation wherein the conduit network further includes a servo fuel inlet, the servo valve may be movable between: (i) a first position (e.g., the position shown in FIG. 3) in which the servo valve fluidly couples the first DSV control chamber to the servo fuel inlet, and (ii) a second position (e.g., the position shown in FIG. 2) in which the servo valve fluidly isolates the first DSV control chamber from the servo fuel inlet.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. Various changes may be made in the function and arrangement of elements described in an exemplary embodiment without departing from the scope of the invention as set-forth in the appended Claims.

What is claimed is:

1. A combined overspeed and fuel stream selector system, comprising:
   a conduit network having a primary fuel inlet, a secondary fuel inlet, a primary fuel outlet, and a secondary fuel outlet;
   a shutoff valve fluidly coupled between the primary fuel inlet and the primary fuel outlet, the shutoff valve having a pressurizing valve control chamber and a pressuring valve element fluidly coupled to an outlet of a primary fuel metering valve upstream of a Discharge Select Valve (DSV);

the DSV fluidly coupled to the shutoff valve, the DSV including a first DSV control chamber opposite a second DSV control chamber;

the primary fuel metering valve fluidly coupled between the primary fuel inlet and the DSV, the primary fuel metering valve upstream from the shutoff valve and the DSV in a direction of fuel flow through the primary fuel inlet, the primary fuel metering valve having the outlet fluidly coupled to the shutoff valve and the DSV;

a bypass valve upstream of the primary fuel metering valve in the direction of fuel flow through the primary inlet, the bypass valve having a bypass valve control chamber fluidly coupled to the outlet of the primary fuel metering valve downstream of the shutoff valve;

a servo valve fluidly coupled to the pressurizing valve control chamber of the shutoff valve, to the DSV, and to the bypass valve through the conduit network, and the servo valve is controllable to switch the combined overspeed and fuel stream selector system between:

a standard operation mode in which the shutoff valve is maintained in an open position, the bypass valve is maintained in a pressure regulating position, and fuel received at the primary fuel inlet is directed through the shutoff valve, through the DSV, and to the primary fuel outlet by a first servo valve pressure applied to the first DSV control chamber and the pressurizing valve control chamber, and the second DSV control chamber in fluid communication with the outlet of the primary fuel metering valve; and a backup operation mode in which the shutoff valve is maintained in a closed position to block fuel flow from the primary fuel inlet to the primary fuel outlet, the bypass valve is maintained in an open position and the DSV reroutes fuel flow received at the secondary fuel inlet to the primary fuel outlet.

2. The combined overspeed and fuel stream selector system of claim 1, wherein the DSV directs fuel received at the secondary fuel inlet to the secondary fuel outlet in the standard operation mode.

3. The combined overspeed and fuel stream selector system of claim 1, wherein the conduit network further comprises a fuel return outlet, and wherein the bypass valve is fluidly coupled between the primary fuel inlet and the fuel return outlet.

4. The combined overspeed and fuel stream selector system of claim 3, wherein the bypass valve impedes fuel flow from the primary fuel inlet to the fuel return outlet in the standard operation mode and permits substantially unimpeded fuel flow from the primary fuel inlet to the fuel return outlet in the backup operation mode.

5. The combined overspeed and fuel stream selector system of claim 1, further comprising an engine controller, wherein the servo valve comprises an electro-hydraulic servo valve having an electronic interface operably coupled to the engine controller.

6. The combined overspeed and fuel stream selector system of claim 1, wherein the shutoff valve comprises a pressurizing valve located downstream of the primary fuel metering valve in the direction of fuel flow through the primary fuel inlet.

7. The combined overspeed and fuel stream selector system of claim 1, wherein the outlet of the primary fuel metering valve is fluidly coupled to the pressurizing valve control chamber and to the first DSV control chamber.

8. The combined overspeed and fuel stream selector system of claim 1, wherein the DSV comprises:
a DSV spool;
the first DSV control chamber on a first side of the DSV spool; and
the second DSV control chamber on a second, opposing side of the DSV spool.

9. The combined overspeed and fuel stream selector system of claim 8, wherein the servo valve is fluidly coupled to the first DSV control chamber and the second DSV control chamber, the servo valve controllable to position the DSV spool when the combined overspeed and fuel stream selector system transitions from the standard operation mode into the backup operation mode by increasing a fuel pressure within the first DSV control chamber, while simultaneously decreasing a fuel pressure within the second DSV control chamber.

10. The combined overspeed and fuel stream selector system of claim 9, wherein the conduit network further comprises a fuel return outlet, and wherein the servo valve is movable between: (i) a first position in which the servo valve fluidly couples the first DSV control chamber to the fuel return outlet, while fluidly isolating the second DSV control chamber therefrom, and (ii) a second position in which the servo valve fluidly couples the second DSV control chamber to the fuel return outlet, while fluidly isolating the first DSV control chamber therefrom.

11. The combined overspeed and fuel stream selector system of claim 9, wherein the conduit network further comprises a servo fuel inlet, and wherein the servo valve is movable between: (i) a first position in which the servo valve fluidly couples the first DSV control chamber to the servo fuel inlet, and (ii) a second position in which the servo valve fluidly isolates the first DSV control chamber from the servo fuel inlet.

12. The combined overspeed and fuel stream selector system of claim 1, wherein the DSV further blocks fuel flow from the primary fuel inlet to the primary fuel outlet in the backup operation mode.

13. A combined overspeed and fuel stream selector system, comprising:
a primary fuel supply path configured to supply a fuel at a first pressure to a primary fuel inlet in a standard routing position;
a secondary fuel supply path configured to supply the fuel at a second pressure to a secondary fuel inlet in the standard routing position, the secondary fuel supply path including a secondary fuel metering valve;
a conduit network including the primary fuel inlet, the secondary fuel inlet, a primary fuel outlet, and a fuel return outlet;
a bypass valve fluidly coupled between the primary fuel inlet and the fuel return outlet, the bypass valve movable between: (i) a pressure regulating position in which the bypass valve impedes fuel flow from the primary fuel inlet to the fuel return outlet, and (ii) a non-pressure regulating position in which the bypass valve permits substantially unimpeded fuel flow from the primary fuel inlet to the fuel return outlet, the bypass valve having a bypass valve control chamber;
a Discharge Select Valve (DSV) fluidly coupled to the primary fuel inlet, the primary fuel outlet and the secondary fuel inlet, the DSV including a first DSV control chamber opposite a second DSV control chamber, the DSV movable between: (i) the standard routing position in which the DSV directs fuel flow received at the primary fuel inlet to the primary fuel outlet, and (ii)

a backup routing position in which the DSV directs fuel flow received at the secondary fuel inlet to the primary fuel outlet;

a primary fuel metering valve fluidly coupled between the primary fuel inlet and the DSV, the primary fuel metering valve upstream from the DSV and downstream from the bypass valve in a direction of fuel flow through primary fuel inlet, the primary fuel metering valve having an outlet fluidly coupled to the DSV and to the bypass valve control chamber;

a shutoff valve fluidly coupled between the primary fuel metering valve and the DSV, the shutoff valve having a pressurizing valve control chamber and a pressuring valve element fluidly coupled to the outlet of the primary fuel metering valve upstream of the DSV and the bypass valve control chamber; and a servo valve fluidly coupled to the first DSV control chamber of the DSV, to the second DSV control chamber of the DSV, to the pressurizing valve control chamber of the shutoff valve and to the bypass valve, the servo valve controllable to transition the DSV between the standard routing position and the backup routing position and to concurrently transition the bypass valve between the pressure regulating position and the non-pressure regulating position, wherein in the standard routing position, the servo valve is configured to apply a first servo valve pressure to the first DSV control chamber and the pressurizing valve control chamber, and is configured to place the second DSV control chamber in fluid communication with the outlet of the primary fuel metering valve.

14. The combined overspeed and fuel stream selector system of claim 13, wherein the shutoff valve is downstream from the primary fuel metering valve in the direction of fuel flow through the primary fuel inlet, and the servo valve is configured to move the shutoff valve into a closed position when moving the DSV into the backup routing position and moving the bypass valve into the non-pressure regulating position.

15. The combined overspeed and fuel stream selector system of claim 1, further comprising a bleed defined between the outlet of the primary fuel metering valve and the bypass valve control chamber.

16. The combined overspeed and fuel stream selector system of claim 1, further comprising a primary fuel supply path configured to supply a fuel at a first pressure to the primary fuel inlet in a standard routing position, a secondary fuel supply path configured to supply the fuel at a second pressure to the secondary fuel inlet in the standard routing position, and the secondary fuel supply path includes a secondary fuel metering valve.

17. The combined overspeed and fuel stream selector system of claim 13, wherein in the backup routing position, the servo valve is configured to apply a second servo valve pressure to the first DSV control chamber and the pressurizing valve control chamber to close the shutoff valve and open the bypass valve, the second servo valve pressure greater than the first servo valve pressure, and the servo valve is configured to place the second DSV control chamber in fluid communication with the fuel return outlet.

* * * * *